United States Patent [19]

Wodnicki

[11] Patent Number: 4,685,994

[45] Date of Patent: Aug. 11, 1987

[54] POSTAGE STAMP DISPENSER

[76] Inventor: Tomasz J. Wodnicki, 6805 Veterans Blvd., Metairie, La. 70003

[21] Appl. No.: 808,297

[22] Filed: Dec. 12, 1985

[51] Int. Cl.[4] ........................ B32B 31/18

[52] U.S. Cl. ........................ 156/517; 156/578; 156/579; 156/DIG. 35; 156/DIG. 50

[58] Field of Search ............... 156/517, 528, 575, 578, 156/579, DIG. 35, DIG. 42, DIG. 50

[56] References Cited

U.S. PATENT DOCUMENTS

| | | | |
|---|---|---|---|
| 972,917 | 10/1910 | Rettich | 156/DIG. 50 |
| 1,239,624 | 9/1917 | Reichhelm | 156/DIG. 50 |
| 1,534,355 | 4/1925 | Bishop et al. | 156/DIG. 50 |
| 2,500,845 | 3/1950 | McCausland | 156/DIG. 50 |

FOREIGN PATENT DOCUMENTS

| | | | |
|---|---|---|---|
| 15834 | of 1910 | United Kingdom | 156/DIG. 50 |

*Primary Examiner*—Caleb Weston

*Attorney, Agent, or Firm*—Keaty & Keaty

[57] ABSTRACT

There have been devices for storing and dispensing postage stamps. These devices have been very complex, bulky devices appropriate for offices where large volumes of mailings are made. There are also small simple devices consisting of a simple cylinder with a slot through which the stamps project for a later manual tearing and licking and placing on letters and parcels. This invention comprises a compact, simple and dependable device which not only stores a roll of stamps but also deploys the stamps individually, moistens the individually deployed stamps just prior to placement on a letter or parcel and severs the just moistened stamp for later pressing in an automatic and sequential fashion. The device includes features which permit each and every stamp to be deployed from the roll down to the very last stamp.

13 Claims, 12 Drawing Figures

POSTAGE STAMP DISPENSER

BACKGROUND OF THE INVENTION

Field of the Invention

This invention concerns postage stamp dispensers. More particularly, this invention relates to portable. type postage stamp dispensers such as would be used to hand stamp, in a convenient manner, parcels, envelopes, etc. Containers for postage stamps are quite notorious. A particular form of postage stamp dispensing is that in the roll form. Postage stamps of common denomination, such as a postage stamp necessary to mail, by first class, an ordinary business letter, are often sold in roll form. It is not unusual to have available small cylindrical dispensers which permit the manual tearing off, licking and pressing on a business envelope, thereby dispensing the stamps.

Other sorts of postage stamp dispensers are known. These are complex bulky mechanisms more suited for large offices or mass mailing situations. For such uses, it is more typical to use postage meters which are licensed to business, etc., to care for their postage requirements. For the typical postage stamp user, these large machines are entirely inappropriate. Accordingly, there has been little practical solution to the problem of dispensing, one at a time, a postage stamp and moistening the same without considerable sanitary problems normally associated with manually tearing off a stamp, licking the stamp and placing it on the envelope.

The instant invention solves many of these problems by providing a compact, aesthetically presentable, postage stamp dispenser specifically designed to retain, dispense, moisten, separate and press a postage stamp selectively onto an envelope, parcel, etc. to this end. The instant invention comprises a dispenser for a roll of postage stamps and the like. As is well known, a roll of postage stamps has a known width and each stamp is defined in length by a series of perforations extending substantially across the width of the stamp. The device of the present invention provides a means for retaining such a roll of postage stamps and, associated therewith, a means for deploying the stamps in series from this retaining means. Also provided is a means for automatically moistening a stamp deployed by this means for deploying while retaining the remaining stamps in the roll within the dispenser for later dispensing. This device also includes a means for separating the stamp just moistened by the means for moistening from the stamps remaining in the dispenser.

The device further includes means for pressing the just moistened stamp substantially onto the surface of the envelope immediately after being moistened and separated by other portions of the device. All of these operations to the dispensed stamp, that is the deploying, moistening, the separating and the pressing are accomplished by the operation of a single push button located near the top surface of the case of the dispenser.

Detailed Description of the Preferred Embodiment

Figures 1, 2, 3, 4:
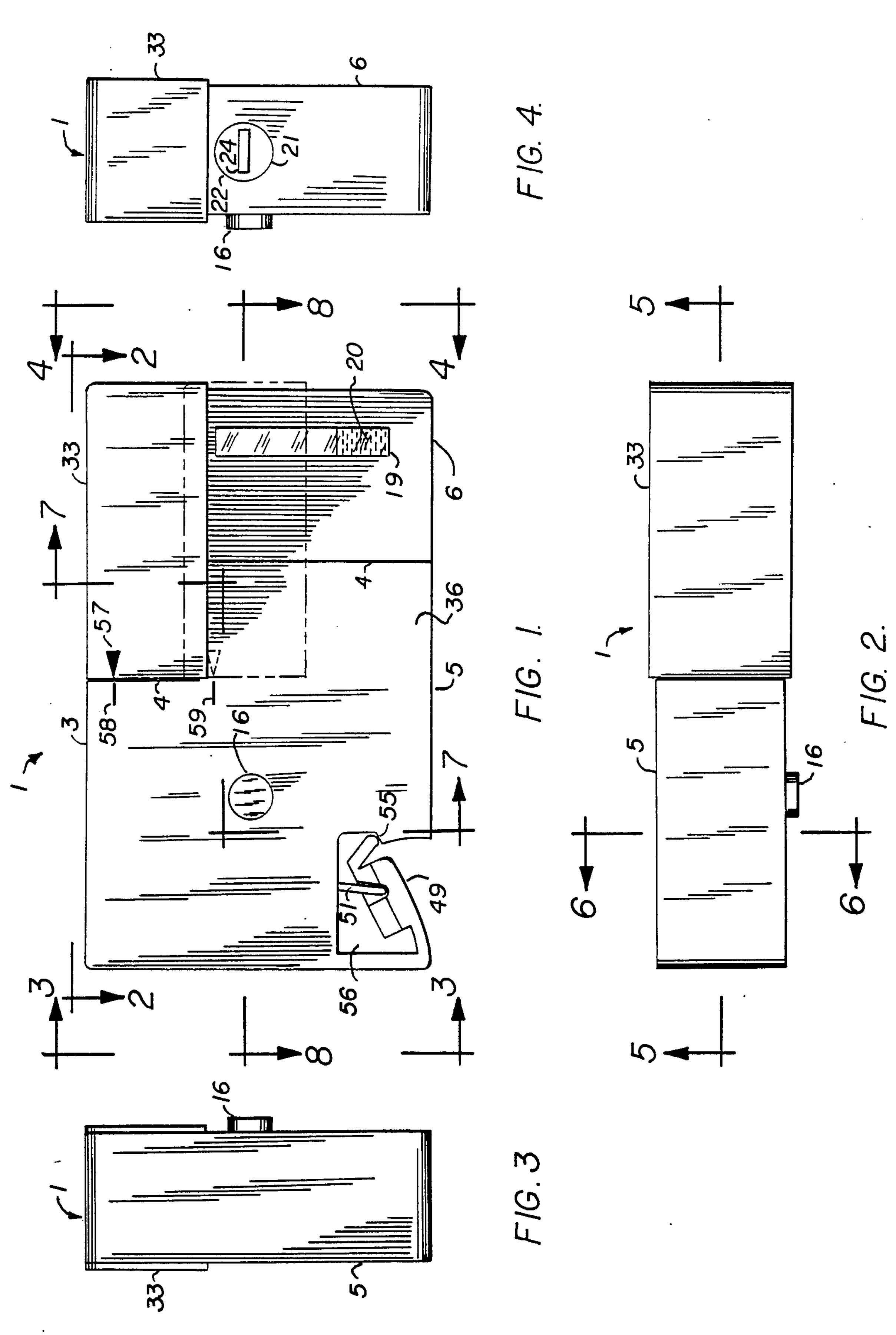
FIG. 1 shows a front elevational view of a dispenser in accordance with the present invention.
FIG. 2 is a top view of the device shown in FIG. 1.
FIG. 3 is a left side view of the device shown in FIG. 1.
FIG. 4 is a right side view of the device shown in FIG. 1.

Referring now to the drawings, a dispenser 1 for a roll of postage stamps 2 is shown. From the outside, the plastic housing 3 can be seen to be capable of being separated along line 4 into two main parts, specifically first part 6 and second part 5.

Figure 5:
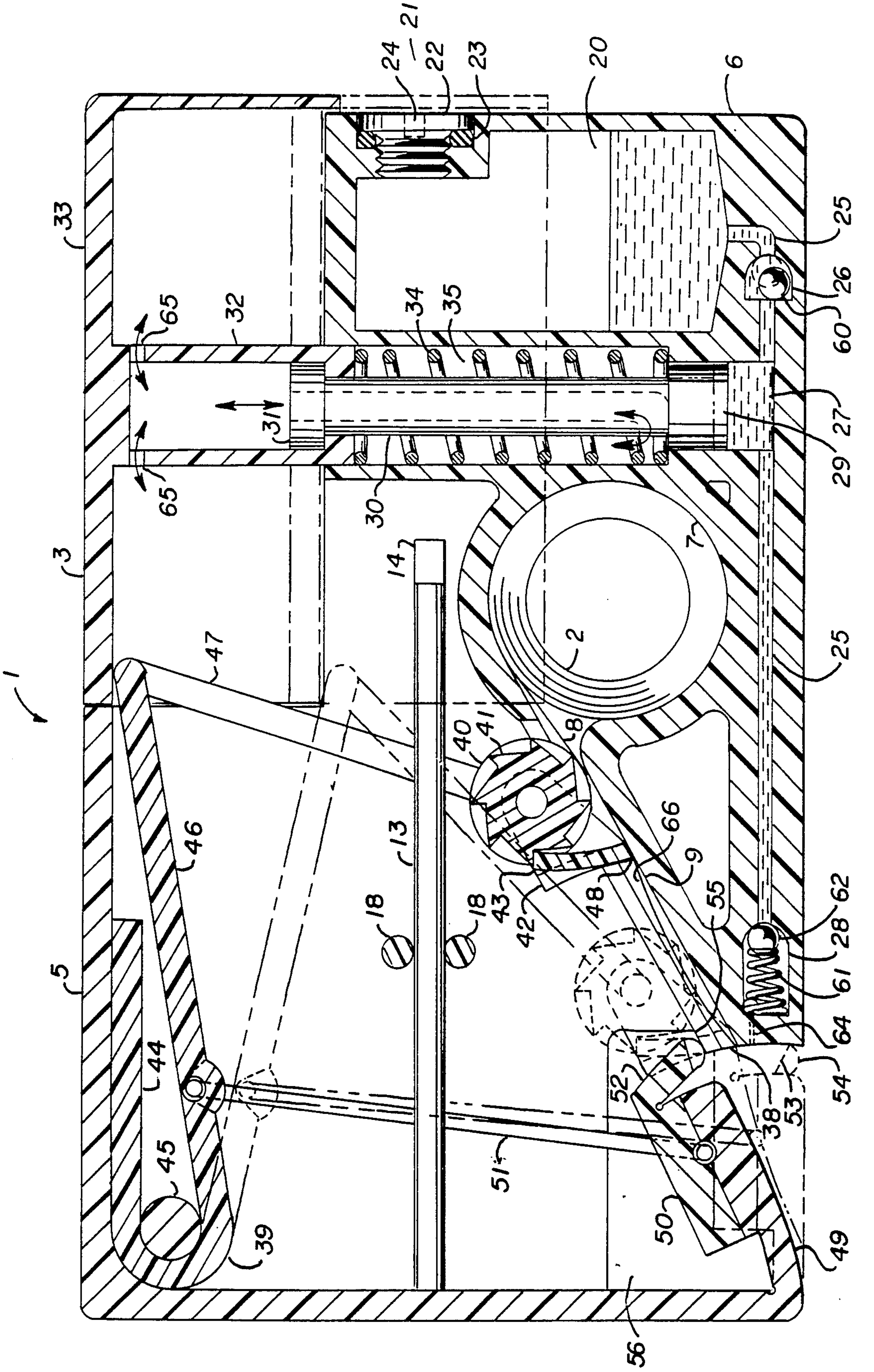
FIG. 5 is an enlarged cross-sectional view taken along section lines 5—5 of FIG. 2, the phantom lines showing the relative position of the various parts of the dispenser when a dispensed stamp has just been pressed onto a letter, parcel, etc.
Figures 9, 10, 11, 12:
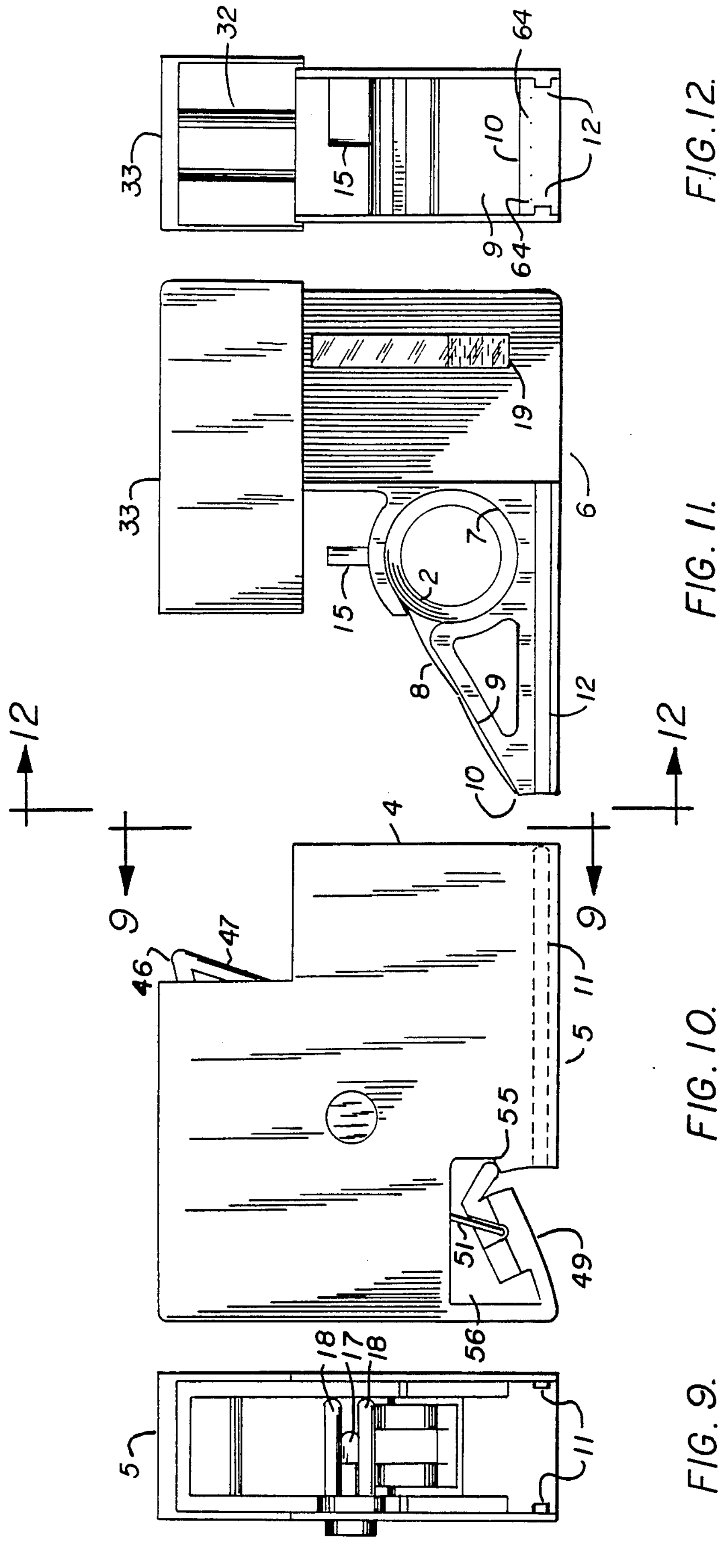
FIG. 9 shows the interior of part 5 of the dispenser housing as viewed along lines 9—9 of FIG. 10.
FIG. 10 shows part 5 of the dispenser housing shown in FIG. 1.
FIG. 11 shows part 6 of the dispenser housing shown in FIG. 1.
FIG. 12 shows the interior of part 6 of the dispenser housing as viewed along lines 12—12 of FIG. 11.

The dominant features of the device, as viewed in FIG. 1, include a push button 33 located at the uppermost surface of the dispenser housing 3, a flexible press 49 located in the lowermost corner and a clear polymer window 19 which permits a view of an internal water reservoir 20 for water dispensing. FIG. 2 shows the push button 33 comprising a substantial portion of the upper surface of the dispenser housing 3. It is most preferred that most or all of the parts of the housing and many of the internal parts be made of a substantially rigid but tough plastic or polymer such as PVC or a durable polycarbonate. Since the present device will be displayed prominently on a desk, certain portions of the case could have a decorative finish, as simulated leather or sterling silver appointments. Indeed, button 33 could be sterling silver to receive an engraving or other memento of a special occasion. FIG. 3 shows a button 16 which permits separating of the parts 5 and 6 along line 4 as previously stated. The operation of button 16 will be set forth in further detail below. Shown in FIG. 4 is a threaded plug 22 with a slot sized to receive in its groove 24 the edge of a coin and such for access to the water reservoir 20, having water inlet 21. Turning to FIG. 5, which is a cross-sectional view taken along lines 5—5 of FIG. 2, the internal workings of the assembled dispenser are shown. Contained in the internal cavity 7 is a typical roll 2 of postage stamps 8. Such postage stamps are notoriously dispensed in rolls and can be purchased at any post office. Approximately two stamps 8 are shown unrolled from roll 2, being constrained along inclined surface 9. As is typical in stamp rolls, each stamp is defined in length by a series of perforations extending substantially across the width of the roll, here shown at 48 in FIG. 5. FIG. 11 shows part 6 separated from part 5, and more clearly shows the relationship of the roll of postage stamps 2, the inclined surface 9 and the cavity 7. The cavity 7 is open on either side but the roll of stamps is prevented from spilling outwardly when part 5 with its vertical sides is placed over the inter-engaging portions of part 6.

Figure 8:
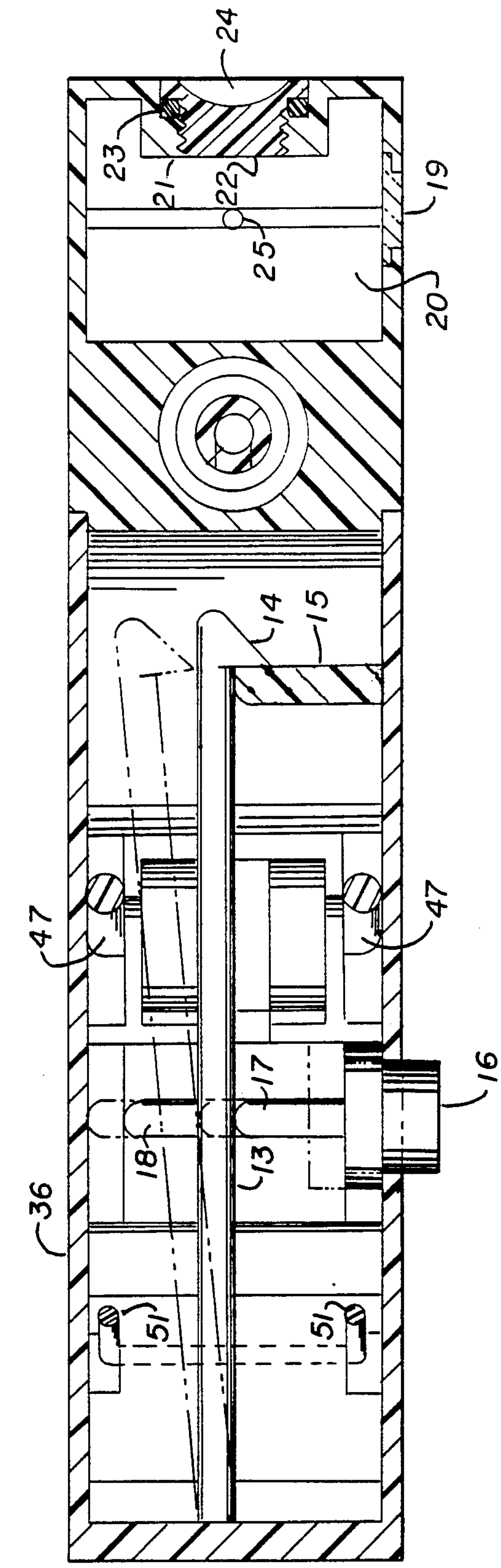
FIG. 8 is an enlarged cross-sectional view taken along lines 8—8 of FIG. 1.

Once a roll of postage stamps is placed in cavity 7, parts 5 and 6 are inter-engaged. Once in position, the parts are locked together by the engagement of wall protrusion 15 carried on the upper portion of cavity 7 by the hooked end 14 of flexing rod 13, best seen in FIG. 8. To separate these two parts, one needs to only push button 16 which, in turn, engages flexing rod 13 via extension 17 resulting in the movement shown in phantom in FIG. 8. The flexing rod 13 is held in position perpendicularly relative to the wall protrusion 15 by limiting extensions 18 which flank the rod 13 and retain it in position. Returning to FIG. 5, we see that part 6 includes water reservoir 20, previously discussed, accessed by threaded plug 22 which seals on conventional O-ring 23. Water is shown partially filling the reservoir 20 and filling tube 25 molded into and along the bottom surface of the dispenser. A backflow valve 26 of conventional design prevents water from flowing back into the reservoir 20, once piston 29 is displaced downwardly. Thus, the water in tube 25 is forced past a check valve comprising ball 62 and spring 61 and cavity 28 and out through one or a series of very small spray holes 64. Piston 29 is operated in chamber 27 via hollow piston rod 30 which extends upwardly to an upper enlarged portion 31 which is engaged in a linear sliding fashion by hollow part 32 of the push button 33. The push button 33 is biased upwardly to the position shown in FIG. 5 by coil spring 34 pressing against the lowermost surface of the hollow part 32. The push button 33 can be displaced a substantial distance downwardly before the upper portion of hollow part 32 engages the upper surface of enlargement 31 and subsequently depresses the piston 29 in chamber 27. The significance of this will be set forth in further detail below. It is desirable for push button 33 to have relatively free travel at least until the upper end of the piston mechanism 29 is engaged. Therefore, apertures 65 are provided in the upper end of hollow part 32 to permit the escape of air trapped within hollow part 32 as well as surrounding spring 34 in cavity 35.

Figure 7:
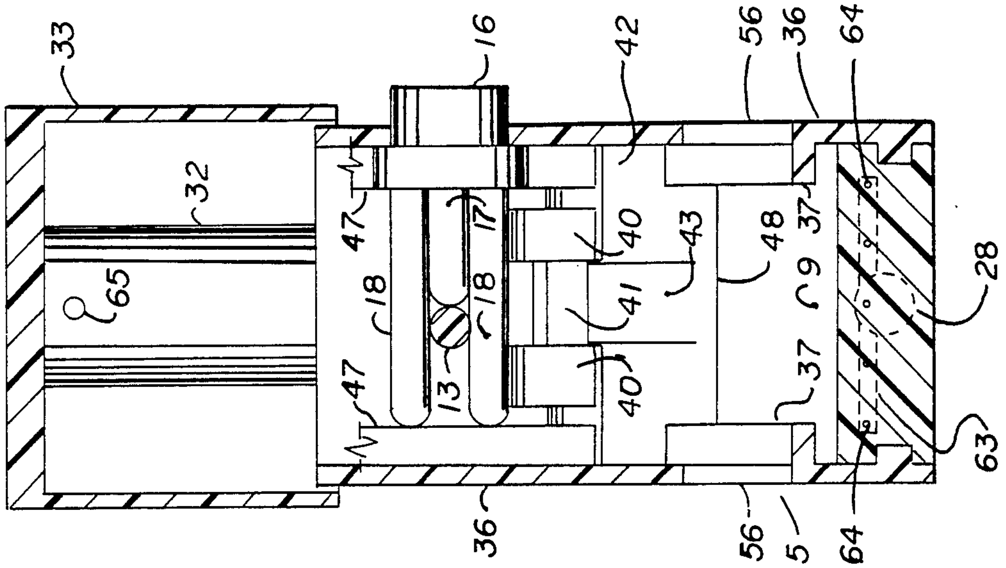
FIG. 7 is an enlarged cross-sectional view taken along section lines 7—7 of FIG. 1.

Returning to the stamp deploying mechanism of the present invention, it can be seen that inclined surface 9 is received along the internal walls of part 5. Part 5, as can been seen in the lower portion of FIG. 7, includes inclined ribs 37 which are parallel but spaced slightly above the surface 9 when parts 5 and 6 are interengaged. These surfaces and ribs cooperate to from upwardly open guiding channel 66 for the stamps dispensed from roll 2. The lower end of this guiding channel 66 terminates in the dispensing slot 38 as shown in FIG. 5.

As shown in FIG. 5, the stamp dispenser 1 of the present invention also comprises a spring 39 which forms an exaggerated U-band with its shoulder arm 44 permanently attached to the dispenser housing then bent more than 180° around cylindrical pin 45 and with its longer arm 46 reaching to the bottom of the push button 33.

Figure 6:
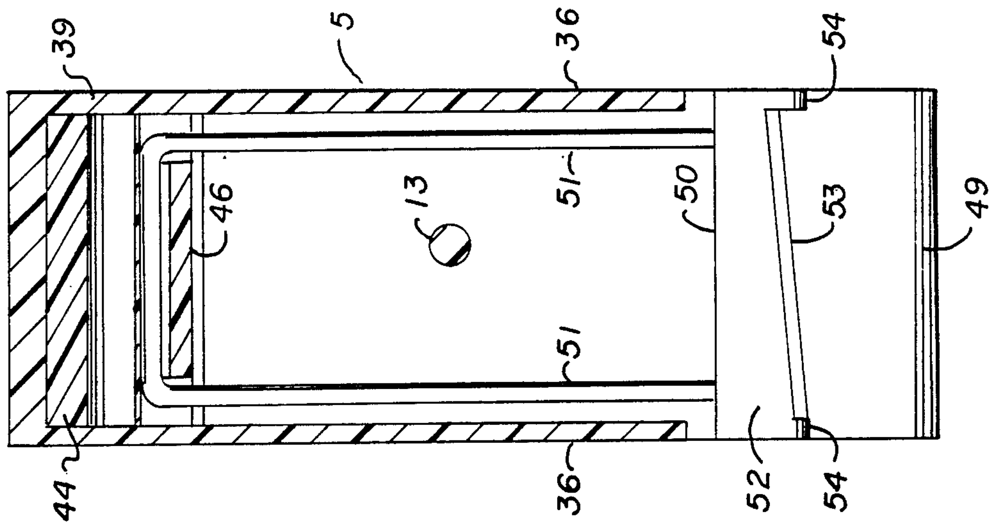
FIG. 6 is an enlarged cross-sectional view taken along lines 6—6 of FIG. 2.

Riding on and along the upwardly open dispensing slot is deploying means comprising preferably a pair of preferably rubber covered wheels 40 flanking a ratchet wheel 41. These wheels are carried on a common axle defined by the terminal end of a rigid fork 47 which, in turn, extends from the terminal end of the long arm 46 of the spring 39. Also carried on these axles are the opposite ends of the pusher 42. The central portion of pusher 42 includes a flexing detent 43 which engages the teeth of the ratchet wheel 41, which prevents the rotation of the wheels 40 while the entire mechanism moves down the guiding channel, but permits the wheels 40 to rotate as the mechanism moves back up the guiding channel. Also located at the lower end of the guiding channel just beyond the dispensing slot 38 is flexible press 49 with cover 50, which in its normal unbiased condition is shown in FIG. 5, as well as in FIG. 10, but can be biased downwardly by the operation of rigid linkage 51. This downward movement is, in general, prevented by the engagement on the lower end of the ribs 37 by the extensions 54 which are resiliently connected to the body of the presser 49. As seen in FIG. 6, this portion of the presser 49 is in the form of a flap 52 which includes the rounded protrusions 54 which engage the inclined extensions 55 (FIG. 5) of the housing 3 and span a relatively sharp edged cutter 53 at a slight right angle to the horizontal as shown in FIG. 6. The upper end of link 51 is connected to a medial portion of the leg 46 of the spring member 39. As shown in phantom in FIG. 5, this link presses downwardly in a springing bias fashion when push button 33 is pressed. Housing 3 is provided with windows 56 of adequate size in both sidewalls 36 so as to allow for free movement of press 49. The operation of the device will now be set forth.

The roll 2 of stamps is put into to the cavity 7 (FIG. 11) so that the free end of the stamps 8 is guided along inclined surface 9 until the leading edge of the first stamp reaches the end 10 of the inclined surface 9. It should be noted that during this operation, parts 5 and 6 are disengaged. After the roll 2 has been positioned as described above in cavity 7 and the leading edge of the first stamp appears at the end 10, parts 5 and 6 are rejoined. To do so, guides 11 of part 5 and grooves 12 of part 6 have to be aligned (better shown in FIGS. 9, 10, 11 and 12), after which both parts 5 and 6 are pressed against each other until they join along line 4. They are held together by an internal locking mechanism consisting of rod 13 with hook 14 at its terminal end, wall protrusion 15, push button 16 with its extension 17 and two limiting extensions 18. During a rejoining process of parts 5 and 6 of housing 3, hook 14 presses against the rounded corner of protrusion 15, clears the protrusion and returns to its neutral position, locking together parts 5 and 6 of housing 3.

In order to separate parts 5 and 6 of housing 3, it is necessary to depress button 16 (see phantom lines in FIG. 8) so that extension 17 presses against rod 13. In this manner, hook 14 separates from protrusion 15 and parts 5 and 6 can be separated from each other. Extensions 18, stopped by the side wall 36 of housing 3, are designed to limit the amount of possible depression of push button 16.

Then, push button 33 is depressed so that its side arrow mark 57 (shown in FIG. 1) moves from an upper level mark 58 to a lower level mark 59.

When push button 33 is pressed, it travels downwardly a substantial distance before the upper portion 31 of piston rod 30 is impacted. The lower surface of push button 33 engages the outermost end of arm 46 which moves it downwardly, as shown in phantom lines in FIG. 5. Detent 43 of pusher 42 engages one of the teeth of the ratchet wheel 41 preventing wheels 40 from rotating. The stamps, having already been deployed in the guiding channel 66, are gripped by the lower edge of the pusher 42, already having the perforations 48 positioned at its leading edge, as well as by the outer surface of the wheels 40. The stamp 8 and wheels 40 and pusher 42 move this unit down the inclined guiding slot to place the perforations 48 proximate the outer surface of the dispensing slot 38. Presser 49 has until now remained in its solid position as shown in FIG. 5. Upon reaching this position, the upper end 31 of piston rod 30 is engaged by push button 33 causing pressurized water to spray onto the adhesive coated face of the deployed single postage stamp. A slight further movement of the push button 33 as it reaches the bottom of its stroke causes portions of the pusher 42, specifically the edges riding on the ridges 37, to engage the projections 54 of flap 52 permitting removing the support, otherwise up until now, preventing the press 49 from moving downward and subsequently causing the press 49 to snap downward to place the just moistened stamp onto the surface of the envelope, parcel, etc. Simultaneously, the cutting edge 53 of flap 52 impacts the stamp directly proximate the perforations 48, previously aligned to the lower edge of pusher 42, as shown in FIG. 5, severing the stamp and permitting its firm placement on the envelope. Upon releasing the pressure on push button 33, the spring bias of spring 34 forces the push button 33 upwardly. The spring bias of spring 39 causes arm 46 to follow push button 33 to its upper location bringing along wheels 40 and pusher 42 via fork 47. The wheels 40 are permitted to rotate clockwise as shown in FIG. 5 along the upper surface of the stamps 8 deployed along inclined surface 9. The final configuration as shown in FIG. 5 with the lower edge of the pusher 42 coming to rest above the next set of perforations 48 of the stamps 8 remaining along the guiding channel 66 therebelow. In this condition, the next stamp is ready to be deployed remaining dry and isolated from the water having been sprayed on the just previously deployed stamp.

At the same time, upon release of push button 33, spring 34 which was compressed during the dispensing process, loses its tension and moves the dispensing push button 33 to its upper neutral position until the arrow mark 57 is again aligned with the upper level mark 58. Spring cavity 35 is filled again by air through opening 65, and the lower piston 29 is forced to move up so that ball 60 of valve 26 is no longer pressed to connecting tubing with the water tank 20. Water from tank 20 under influence of gravity again fills up cyclinder 27 and connecting tubings 25. The discharge wall spring 61 presses back the ball 62 against the valve inlet, stopping the water flow.

It should be noted that the apparatus as set forth is capable of dispensing each and every stamp in the roll including the very last stamp since the last stamp would be held in position in the guiding channels and be gripped at its upper edge by the pusher 42.

On dispensing the very last stamp, first and second pieces of the dispensing case can be separated by pressing the button 16 and a new roll can be placed in cavity 7 as set forth previously.

I claim:

1. A dispenser for dispensing postage stamps from a roll of stamps, said dispenser comprising:
- means for retaining a roll of stamps;
- means for deploying said stamps in series from said means for retaining;
- means for moistening a stamp, deployed by said means for deploying, including means for spraying water onto an adhesive-coated side of said stamp; and
- means for separating said stamp moistened by said means for moistening from any stamps remaining in said dispenser.

2. A dispenser as set forth in claim 1 further including means for pressing said stamp, after being moistened by said means for moistening, onto a predetermined surface.

3. A dispenser as set forth in claim 2 further comprising:
- operating means for operating substantially simultaneously said means for separating and said means for pressing.

4. A dispenser as set forth in claim 3 wherein said operating means includes a push button positioned on an upper surface of the dispenser for vertical depression by an operator and linkage means interconnecting said push button with said means for separating and said means for pressing.

5. A dispenser as set forth in claim 3 wherein:
- said means for pressing comprises a flexible press resiliently connected adjacent a lowermost portion of said dispenser and normally unbiased from said surface; and
- said means for separating includes a cutting edge carried by said flexible press.

6. A dispenser as set forth in claim 3 wherein said operating means includes means for spraying water onto an adhesive coated side of said stamp deployed by said means for deploying, prior to being separated by said means for separating, but after being deployed by said means for deploying.

7. A dispenser as set forth in claim 6 wherein said means for spraying includes a piston operated by a push button positioned on an upper surface of said dispenser.

8. A dispenser for postage stamps comprising:
- a first part, and a second part separable from said first part;
- means for releasably engaging said first and second parts, said first part including a cavity for receiving a supply of stamps, a reservoir for a supply of water, and means for dispensing water from said reservoir onto a first stamp, including means for spraying water onto an adhesive-coated side of said first stamp;
- means for deploying said first stamp from said supply of stamps;
- means for pressing said first stamp, after being deployed by said means for deploying, onto a surface; and
- means for separating the first stamp from said supply of stamps, wherein separation of said first stamp occurs substantially simultaneously with pressing of said first stamp.

9. A dispenser as set forth in claim 8 wherein said first part further includes a push button positioned at an upper surface thereof for operating said means for dispensing water.

10. A dispenser as set forth in claim 8, wherein said second part includes a pusher for engaging a second stamp upon exit from said cavity in said first part, spring means biasing said pusher in a position proximate said cavity when said first and said second parts are interengaged, said spring means including a first arm for engaging said push button of said first part and a second arm projecting therefrom and engaging said pusher whereby said pusher pushes the first stamp when said push button is depressed.

11. A dispenser as set forth in claim 10 wherein said first arm of said spring engages a linkage, which in turn engages said means for pressing, whereby upon pushing said button, said means for pressing presses the first stamp pushed by said pusher in a sequential manner.

12. A dispenser for postage stamps printed in a roll format, said dispenser comprising:

means for moistening a stamp;

a housing separable on demand, into a first part and a second part to facilitate loading of a roll of stamps, the first part having an internal cavity configured to receive said roll of stamps, a top portion of said internal cavity having a slot through which a free end of said roll of stamps can be pulled along an inclined surface adjacent said slot, the second part of said housing having side walls including inclined ribs extending inwardly from an internal side of said side walls such that when said first part and said second part are joined, the side walls close the internal cavity and said inclined ribs extend parallel with and spaced from said inclined surface to form a guiding channel for the free end of the roll of stamps extending from said slot of said cavity, the guiding channel terminating in a dispensing slot proximate a lower surface of said dispenser, said guiding channel being open along its top to allow a stamp advancing mechanism access to the stamps in said channel, said stamp advancing mechanism comprising:

a wheel riding along said guiding channel;

a ratchet wheel co-axial with said wheel;

a pusher carried by an axle supporting said wheel and said ratchet wheel;

a spring which, in its normal state, retains said ratchet wheel on said pusher in a position proximate said cavity and, in its depressed state, moves said wheel and said ratchet wheel on said pusher down said guiding channel toward said dispensing slot;

said first part of said housing further including a push button which, when said first part and said second part are inter-engaged engages said spring such that when said push button is depressed, said wheel, said ratchet wheel and said pusher advance downwardly along the guiding channel;

said pusher further including a detent engaging a tooth of said ratchet wheel such that said wheel is prevented from turning by said tooth when said push button is depressed, whereby the outer surface of said wheel drags on the stamps deployed in said guiding channel causing said stamps to advance down said guiding channel and out of said dispensing slot.

13. The dispenser of claim 12, wherein said means for moistening a stamp comprises a means for spraying water onto an adhesive-coated side of said stamp.

* * * * *